United States Patent
Henry, Jr.

(10) Patent No.: US 6,526,292 B1
(45) Date of Patent: Feb. 25, 2003

(54) SYSTEM AND METHOD FOR CREATING A DIGIT STRING FOR USE BY A PORTABLE PHONE

(75) Inventor: Raymond C. Henry, Jr., Wake Forest, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/277,498

(22) Filed: Mar. 26, 1999

(51) Int. Cl.⁷ .................................................. H04Q 7/10
(52) U.S. Cl. ..................... 455/563; 455/564; 379/88.03
(58) Field of Search ........................... 455/550, 563, 455/569, 575, 403, 426, 462, 564, 90, 518, 525, 552, 553, 556, 557, 422; 704/200, 221, 246, 251, 252, 275; 379/354, 355, 356, 357, 88, 89, 67, 88.01, 88.02, 88.13

(56) References Cited

U.S. PATENT DOCUMENTS

| | | | |
|---|---|---|---|
| 4,870,686 A | | 9/1989 | Gerson et al. |
| 5,020,107 A | | 5/1991 | Rohani et al. |
| 5,111,501 A | * | 5/1992 | Shimanuki .................. 379/355 |
| 5,125,022 A | * | 6/1992 | Hunt et al. .............. 379/88.02 |
| 5,163,084 A | * | 11/1992 | Kim et al. ..................... 379/88 |
| 5,303,299 A | * | 4/1994 | Hunt et al. .............. 379/88.01 |
| 5,369,685 A | | 11/1994 | Kero |
| 5,594,784 A | * | 1/1997 | Velius ......................... 379/88 |
| 5,659,597 A | * | 8/1997 | Bareis et al. ............... 455/563 |
| 5,805,672 A | * | 9/1998 | Barkat et al. ................. 379/67 |
| 5,826,199 A | * | 10/1998 | Maeda ....................... 455/563 |
| 5,864,603 A | * | 1/1999 | Haavisto et al. ............... 379/88 |
| 5,915,001 A | * | 6/1999 | Uppaluru .................. 379/88.22 |
| 5,917,889 A | * | 6/1999 | Brotman et al. .......... 379/88.01 |
| 6,061,654 A | * | 5/2000 | Brown et al. ................ 704/275 |
| 6,073,103 A | * | 6/2000 | Dunn et al. ................. 704/276 |
| 6,081,730 A | * | 6/2000 | Lieben et al. ............... 455/557 |
| 6,128,482 A | * | 10/2000 | Nixon et al. ................ 455/414 |
| 6,157,844 A | * | 12/2000 | Doran et al. ................ 455/552 |
| 6,185,532 B1 | * | 2/2001 | Lemaire et al. ............. 704/258 |
| 6,208,965 B1 | * | 3/2001 | Brown et al. ............... 704/246 |
| 6,377,820 B1 | * | 4/2002 | Courtis et al. .............. 455/563 |

FOREIGN PATENT DOCUMENTS

| | | | |
|---|---|---|---|
| EP | 0 746 129 A2 | 12/1996 | |
| GB | 2 290 437 A | 12/1995 | |
| WO | WO 97/12361 | 4/1997 | |
| WO | 9712361 | * 4/1997 | ............. G01L/9/00 |

* cited by examiner

*Primary Examiner*—Thanh Cong Le
*Assistant Examiner*—Pablo N Tran
(74) *Attorney, Agent, or Firm*—Coats & Bennett, P.L.L.C.

(57) ABSTRACT

A system and method of creating a digit string for use by a phone includes the steps of collecting speech data having numerical digits and/or alphabetical characters, parsing the speech data, converting each alphabetical character of the speech data into a numerical digit associated therewith, and assembling the speech data chronologically to form a digit string consisting of numerical digits and/or converted alphabetical characters. The converting step further includes comparing each alphabetical character of the speech data to a mapping table stored in memory and determining a numerical digit corresponding to each alphabetical character of the speech data from the mapping table.

41 Claims, 3 Drawing Sheets

| ALPHABETICAL CHARACTER | NUMERICAL DIGIT EQUIVALENT |
|---|---|
| A, B, OR C | 2 |
| D, E, OR F | 3 |
| G, H, OR I | 4 |
| J, K, OR L | 5 |
| M, N, OR O | 6 |
| P, Q, R, OR S | 7 |
| T, U, OR V | 8 |
| W, X, Y, OR Z | 9 |

FIG. 3

SYSTEM AND METHOD FOR CREATING A DIGIT STRING FOR USE BY A PORTABLE PHONE

BACKGROUND OF THE INVENTION

1. Field of the Invention

The present invention relates generally to the use of digit strings by a portable phone and, more particularly, to a system and method for creating a digit string for use by a portable phone from speech data including alphabetical characters.

2. Description of Related Art

It has become well known in the communications art to rely upon voice or speech signals to impart data and/or instructions to a terminal handset or portable phone. This is particularly useful in a vehicle or other similar environment when manual implementation of the communications device is limited or not practical. In such case, a person is able to merely speak the numerical digits desired and then verbally give a command (e.g., "dial") as to how the digit string is to be utilized. Accordingly, the user of the phone need not direct his attention exclusively to the phone by looking at and pushing the desired keys.

While the aforementioned manner of voice dialing is helpful in most circumstances, it clearly is limited when alphabetical characters are involved. For example, many commercial entities attempt to procure a phone number which, when applied to the standard phone keypad, spell out the company name or provide some alphabetical or phonic association therewith. The dial string for placing a call may thus become better known by alphanumeric representation instead of the numerical digits alone. Moreover, advertising of the phone number in this manner (e.g., as with 800 numbers) further promotes memorization for future use.

Since current methods of voice dialing do not permit the input of alphabetical characters, it will be understood that no advantage is present over just looking at and pushing the keys of the phone for numbers consisting of alphanumeric characters. This can obviously be hazardous when a user is driving a vehicle and he desires to dial a number which includes alphabetical characters. Not only must he look at the keypad to manually enter the number, but each alphabetical character also requires mental decoding before doing so.

Accordingly, it is a primary object of the present invention to provide a system and method for creating a digit string for use by a phone from speech data including numerical digits and/or alphabetical characters.

It is another object of the present invention to provide a system and method for converting speech data including alphabetical characters into numerical digits for inclusion in a digit string.

It is still another object of the present invention to provide a telephone and method for safely dialing such telephone from speech data containing alphabetical characters while in a vehicle or other similar environment.

Yet another object of the present invention is to provide a system and method for storing speech data including numerical digits and/or alphabetical characters as a digit string in a speed dial location of a phone These objects and other features of the present invention will become more readily apparent upon reference to the following description when taken in conjunction with the following drawings.

SUMMARY OF THE INVENTION

In accordance with a first aspect of the present invention, a method of creating a digit string for use by a phone is disclosed as including the steps of collecting speech data having numerical digits and/or alphabetical characters, parsing the speech data, converting each alphabetical character of the speech data into a numerical digit associated therewith, and assembling the speech data chronologically to form a digit string consisting of numerical digits and/or converted alphabetical characters. The converting step further includes comparing each alphabetical character of the speech data to a mapping table stored in memory and determining a numerical digit corresponding to each alphabetical character of the speech data from the mapping table. Additional steps of the method may include determining whether each numerical digit and alphabetical character of the speech data is recognized, storing each numerical digit and converted alphabetical character of the digit string in a temporary memory location, editing the digit string, and displaying each numerical digit and converted alphabetical character of the digit string.

In accordance with a second aspect of the present invention, a method of dialing a telephone via voice activation is disclosed as including the steps of enabling a mode of a processing circuit in the telephone for receiving a dial string, speaking a plurality of numerical digits and/or alphabetical characters into the telephone, converting each spoken alphabetical character into a numerical digit associated therewith, assembling each spoken numerical digit and each converted alphabetical character chronologically as the dial string, and initiating a call on the telephone utilizing the dial string.

In accordance with a third aspect of the present invention, a mobile telephone is disclosed as including circuitry for performing telephony operations, a microphone for receiving speech data, and a processing circuit for receiving the speech information and converting it into a corresponding digit string. Since the speech information includes numerical digits and/or alphabetical characters, a non-volatile memory is included for storing a look-up table containing a corresponding numerical digit for each alphabetical character. The mobile telephone may also include a volatile memory for temporarily storing the dial string to enable editing, as well as a display for depicting each numerical digit and each converted alphabetical character of the dial string.

In accordance with a fourth aspect of the present invention, a system for creating a digit string from speech data received by a telephone is disclosed, where the speech data includes numerical digits and/or alphabetical characters. The system includes a non-volatile memory for storing a look-up table of corresponding numerical digits for each alphabetical character and a processing circuit for receiving and converting the speech data to a digit string having a plurality of numerical digits in chronological order. The processing circuit converts each alphabetical character of the speech data into a numerical digit. Additionally, the system may include a volatile memory for temporarily storing the digit string and a display connected to the processing circuit for depicting each numerical digit and converted alphabetical character of the digit string.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 3 is an exemplary mapping table in which the alphabetical characters correspond to the numerical digits of a phone keypad.

DETAILED DESCRIPTION OF THE INVENTION

Figure 1:
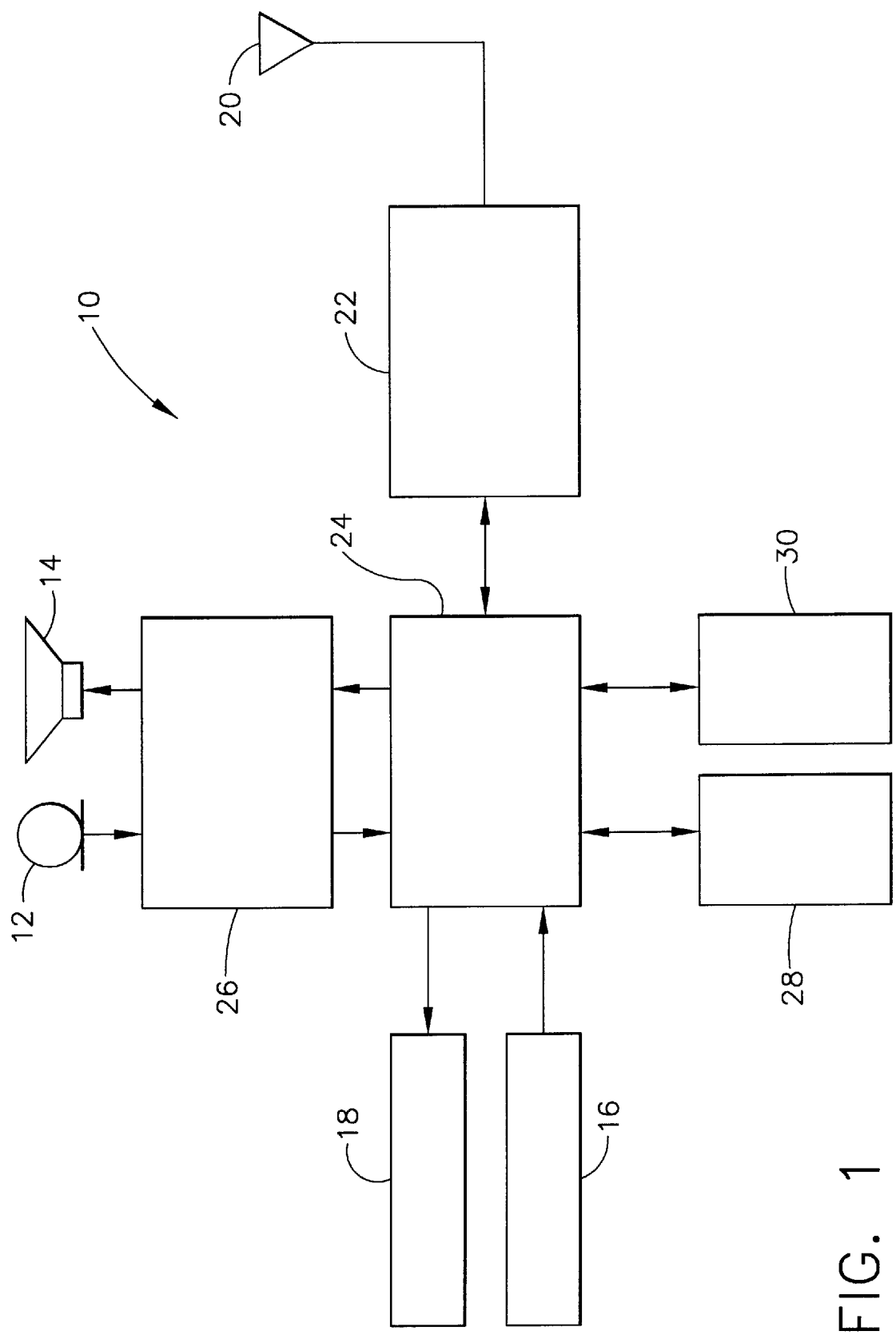
FIG. 1 is a block diagram of a telephone including the system of the present invention.

Referring now to the drawings in detail, wherein identical numerals indicate the same elements throughout the figures, FIG. 1 depicts schematically a telephone 10 which preferably is portable or otherwise located in a mobile environment like a vehicle. It will be seen that telephone 10 includes a microphone 12, a speaker 14, a keypad 16, a display 18, an antenna 20, and certain circuitry for performing telephony operations identified generally by the numeral 22. Telephony circuitry 22 typically includes a transceiver which operates with antenna 20 to transmit and receive signals.

Telephone 10 further includes at least one processing circuit 24 which is connected to various components of telephone 10 and functions to operate it in accordance with certain software modules therein. In accordance with the present invention, where speech data may be entered into telephone 10 via microphone 12, processing circuit 24 is able to receive such speech data and convert it into a corresponding digit string which can be utilized by telephone 10 in several ways. These include using the digit string to dial a third party number, entering the digit string in a speed dial location, and entering the digit string as a password for telephone 10.

It will be appreciated that the present invention is primarily concerned with the case where the speech data includes numerical digits and/or alphabetical characters. This stems from the fact that while digit strings have been created and used by telephones from speech input containing numerical digits alone or by means of designated code words (e.g., for speed dial locations), none have as yet accounted for and permitted individual alphabetical characters to be entered as speech data. Accordingly, a user of telephone 10 need not perform the mental task of converting a phone number containing an alphabetical character to a numerical digit or the manual task of physical pushing the appropriate key. In this way, entry of an alphanumeric phone number becomes much safer in a vehicle or other similar environment since the user need not direct his attention away from driving to do so.

The speech data also preferably includes one of several commands (e.g., dial, store, edit, clear, pause, wait for key input, volume control, and display), which instructs processing circuit 24 how to utilize the digit string. Further, such command signals processing circuit 24 that the digit string is completed.

In order for processing circuit to recognize the speech data input by microphone 12, telephone 10 preferably has a designated operating mode which must be enabled (such as by a certain key on keypad 16). An audio coder/decoder 26 is provided to convert the speech data from analog to digital (and likewise converts signals received by telephone 10 from digital to analog so they may be understood through speaker 14). Additionally, processing circuit 24 includes software which is able to parse the speech data, as well as recognize the speech data itself. Numerous patents have been obtained relating to speech recognition in a phone. Examples of such patents include U.S. Pat. No. 5,222,121 to Shimada, U.S. Pat. No. 4,644,107 to Clowes et al., and U.S. Pat. No. 5,165,095 to Borcherding. Thus, the present invention does not go toward the particular type or manner of speech recognition itself (e.g., speaker dependent or speaker independent), but rather to a particular application in which alphabetical characters in speech data are converted to a corresponding numerical digit and inserted into a digit string. It will be appreciated, however, that should processing circuit 24 not recognize any of the numerical digits, alphabetical characters, or commands of the speech data, processing circuit 24 causes an error to be reported.

Processing circuit 24 interfaces with a non-volatile memory 28 in order to convert each alphabetical character of the speech data to a corresponding numerical digit. This is accomplished via a look-up table stored in non-volatile memory 28, which preferably corresponds to a mapping table of keypad 16 for telephone 10 (see FIG. 3). It will be understood, however, that the look-up table could be configured in any number of ways to provide a numerical digit equivalent for each alphabetical character. A volatile memory 30 is also preferably provided and connected to processing circuit 24 to temporarily store each numerical digit and converted alphabetical character from the speech data in the digit string in the order presented by the speech data. When combined with depicting each numerical digit of the digit string on display 18, this permits the digit string to be edited before proceeding with the intended telephony operation. An alternative way of verifying the accuracy of the digit string is for processing circuit 24 to convert the digit string back to its original speech data and audibly repeat each numerical digit and alphabetical character through speaker 14. In this way, editing can occur without requiring a user to look at display 18.

Figure 2:
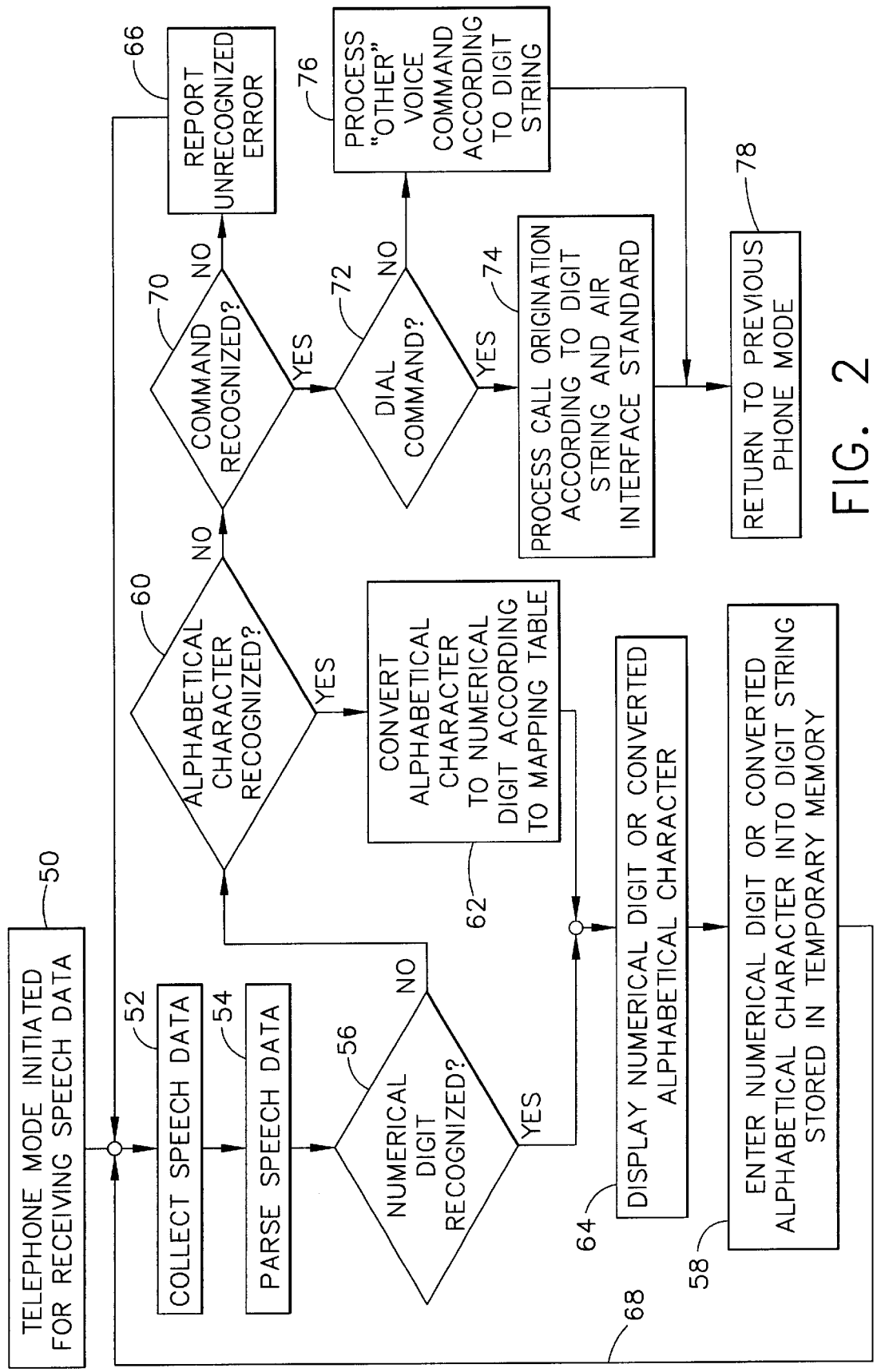
FIG. 2 is a flow chart of the steps by which the method of the present invention is accomplished.

The functional steps accomplished by processing circuit 24 and telephone 10 will be better understood by means of the flow chart in FIG. 2. As seen therein, telephone 10 must be initiated or otherwise be enabled so as to allow reception of the speech data through microphone 12 for purposes of creating a dial string (see box 50). Thereafter, telephone 10 actually collects the speech data which includes numerical digits and/or alphabetical characters (box 52) through microphone 12 and audio coder/decoder 26 and parses it (box 54) by means of processing circuit 24 so that it is in a form that can be used by the speech recognition module thereof.

As seen in decision box 56, processing circuit first determines whether the speech data received is a recognized numerical digit. If the answer is positive, the numerical digit is entered into the dial string within volatile memory 30 (box 58). Should the answer be negative, processing circuit 24 then determines whether the speech data is a recognized alphabetical character (decision box 60). Provided an affirmative result is obtained, processing circuit 24 then converts the alphabetical character to its corresponding numerical digit according to the look-up table in non-volatile memory 28 (box 62). Thereafter, the converted alphabetical character is inserted into the dial string stored in volatile memory 30 (box 58). It will be appreciated that each numerical digit and converted alphabetical character is inserted into the digit string in the order provided by the parsed speech data. In order to permit verification of the digit string's accuracy, it is preferred that the numerical digits and converted alphabetical characters thereof be depicted on display 18 (box 64). Should the speech data not be a recognized alphabetical character (i.e., a negative result from decision box 60), then processing circuit 24 causes an error to be reported such as through display 18 (box 66).

Of course, this process continues for each item (numerical digit or alphabetical character) of the speech data until the digit string is completed, as evidenced by feedback loop 68. Once the digit string is created within volatile memory 28, it then can be utilized by telephone 10 to initiate dialing a third party, stored in a speed dial location, entered as a password, or used for any other function of telephone 10 requiring a digit string. Accordingly, it will be seen in FIG. 2 that a preferred option in the logic of processing circuit 24 includes determining whether the speech data is a recognized command (see decision box 70) should the answer to decision box 60 be negative. The presence of such a command has the function of indicating the end of the digit string, as well as instructing telephone 10 how to use the digit string. Provided the speech data is a recognized command, processing circuit 24 determines whether the command is to commence dialing telephone 10 (decision box 72). If this is the case, processing circuit 24 sends a signal to telephony circuitry 22 to cause a call to originate according to the digit string of box 58 and the applicable air interface standard (box 74). Otherwise, processing circuit 24 sends a signal to cause any other command to proceed (box 76) using the digit string in box 58 (e.g., store, edit, etc.). Of course, it will be appreciated that should the determination by decision box 70 be negative, processing circuit 24 will cause an error to be reported (box 66).

Once the appropriate command is processed by processing circuit 24, telephone 10 will preferably then return to a previous or standard mode of operation where it is not enabled to receive speech data inputs (box 78).

Having shown and described the preferred embodiment of the present invention, further adaptations of the system and method for creating a digit string for use by a phone from speech data including at least alphabetical character can be accomplished by appropriate modifications by one of ordinary skill in the art without departing from the scope of the invention.

What is claimed is:

1. A method of creating a digit string for use by a phone, comprising the following steps:
    (a) collecting speech data in the phone, said data comprising numerical digits and/or alphabetical characters;
    (b) parsing said speech data in the phone;
    (c) converting each alphabetical character of said speech data into a numerical digit associated therewith; and
    (d) assembling, in the phone, said speech data chronologically to form a digit string consisting of numerical digits and/or converted alphabetical characters.

2. The method of claim 1, further comprising the step of determining whether each numerical digit of said speech data is recognized.

3. The method of claim 2, further comprising the step of determining whether each alphabetical character of said speech data is recognized.

4. The method of claim 1, said speech data further including designated commands related to operational features of said phone.

5. The method of claim 4, further comprising the step of determining whether each designated command of said speech data is recognized.

6. The method of claim 1, further comprising the step of storing each numerical digit and converted alphabetical character of said digit string in a temporary memory location.

7. The method of claim 6, further comprising the step of editing said digit string.

8. The method of claim 6, further comprising the step of displaying each numerical digit and converted alphabetical character of said digit string.

9. The method of claim 1, said converting step further comprising:
    (a) comparing each alphabetical character of said speech data to a mapping table stored in memory; and
    (b) determining a numerical digit corresponding to each alphabetical character of said speech data from said mapping table.

10. The method of claim 1, further comprising the step of initiating said phone for receipt of said speech data.

11. The method of claim 4, wherein said designated commands relate to a group of functions consisting essentially of dial, save, pause, wait for key input, clear, volume control, and display.

12. The method of claim 1, further comprising the step of dialing said digit string by said phone for connection to a third party.

13. The method of claim 1, further comprising the step of storing said digit string in a speed dial location of said phone.

14. The method of claim 1, further comprising the step of entering said digit string into said phone as a password.

15. The method of claim 3, further comprising the step of reporting any unrecognized numerical digits and/or alphabetical characters of said speech data.

16. A method of dialing a telephone via voice activation, comprising the following steps:
    (a) enabling a mode of a processing circuit in said telephone for receiving a dial string;
    (b) speaking a plurality of numerical digits and/or alphabetical characters into said telephone;
    (c) converting each spoken alphabetical character into a numerical digit associated therewith;
    (d) assembling each spoken numerical digit and each converted alphabetical character chronologically as said dial string; and
    (e) initiating a call on said telephone representative of said dial string.

17. The method of claim 16, further comprising the step of determining whether each spoken numerical digit and alphabetical character is recognized.

18. The method of claim 16, said converting step further comprising said processing circuit looking up a corresponding numerical digit in a mapping table for each said spoken alphabetical character.

19. The method of claim 16, further comprising the step of displaying each spoken numerical digit and each converted alphabetical character constituting said dial string on a display of said telephone.

20. The method of claim 16, further comprising the step of storing each spoken numerical digit and each converted alphabetical character constituting said dial string in a temporary storage location prior to initiating said call.

21. The method of claim 20, further comprising the step of editing said dial string prior to initiating said call.

22. The method of claim 16, wherein said call is initiated on said telephone by pressing a designated key.

23. The method of claim 16, wherein said call is initiated on said telephone by a spoken command.

24. The method of claim 16, wherein said spoken numerical digits and said converted alphabetical characters of said dial string represent a party number for said call.

25. The method of claim 16, wherein said dial string further includes other telephone function indications.

26. The method of claim 16, further comprising the step of reporting an error when said processing circuit is unable to recognize any spoken numerical digit or alphabetical character of said dial string.

27. A mobile telephone, comprising:
(a) circuitry for performing telephony operations;
(b) a microphone for receiving speech information, said speech information including numerical digits and/or alphabetical characters; and
(c) a processing circuit for receiving said speech information, converting each alphabetical character into a numerical digit associated therewith, and assembling said speech information chronologically into a corresponding digit string.

28. The mobile telephone of claim 27, further comprising a non-volatile memory for storing a look-up table containing a corresponding numerical digit for each alphabetical character.

29. The mobile telephone of claim 28, wherein said processing circuit converts each alphabetical character of said speech data to a corresponding numerical digit by means of said look-up table.

30. The mobile telephone of claim 27, said mobile telephone further comprising a display for depicting each numerical digit and each converted alphabetical character of said dial string.

31. The mobile telephone of claim 27, further comprising a volatile memory for temporarily storing said dial string to enable editing.

32. The mobile telephone of claim 27, wherein said processing circuit causes an error to be reported by said mobile telephone when any of the numerical digits and alphabetical characters of said speech data is not recognized.

33. The mobile telephone of claim 28, wherein said look-up table corresponds to a mapping table of a keypad for said mobile telephone.

34. The mobile telephone of claim 27, wherein said processing circuit provides said digit string to said telephony circuitry to initiate a call.

35. The mobile telephone of claim 27, wherein said processing circuit provides said digit string to a speed dial location of said mobile telephone.

36. The mobile telephone of claim 27, wherein said processing circuit provides said digit string to said telephony circuitry as a password.

37. The mobile telephone of claim 27, wherein said processing circuit converts said digit string back to said speech information and audibly repeats it for verification.

38. A system for creating a digit string from speech data received by a telephone, said speech data including numerical digits and/or alphabetical characters, comprising:
(a) a non-volatile memory for storing a look-up table of corresponding numerical digits for each alphabetical character; and
(b) a processing circuit for receiving said speech data, converting each alphabetical character into a numerical digit associated therewith, and assembling said speech data into a digit string having a plurality of numerical digits in chronological order.

39. The system of claim 38, further comprising a volatile memory for temporarily storing said digit string.

40. The system of claim 38, further comprising a display connected to said processing circuit for depicting each numerical digit and converted alphabetical character of said digit string.

41. The system of claim 38, wherein said look-up table corresponds to a mapping table of a keypad for a telephone.

* * * * *